Patented June 20, 1950

2,512,584

UNITED STATES PATENT OFFICE 2,512,584

AZEOTROPIC DISTILLATION OF ISOPROPYL ALCOHOL FROM DIISOPROPYLAMINE

Everet Fey Smith, Terre Haute, Ind., assignor to Commercial Solvents Corporation, Terre Haute, Ind., a corporation of Maryland No Drawing. Application February 25, 1946, Serial No. 650,132

13 Claims. (Cl. 202—42)

This invention relates to a method for separating diisopropylamine from mixtures comprising diisopropylamine and isopropyl alcohol.

In the production of diisopropylamine by reacting isopropyl alcohol with ammonia, for example, or by hydrogenating a mixture of isopropylamine and acetone, the product always contains an appreciable proportion of isopropyl alcohol. Separation of the diisopropylamine from the isopropyl alcohol cannot be accomplished by direct fractional distillation, owing to the small difference between the boiling points of the two compounds (83.7 and 82.4° C., respectively). Moreover, I have discovered that the prior-art process of distilling the mixture with water to separate the diisopropylamine-water azeotrope boiling at 74.2° C. does not effect a complete separation of the amine from the alcohol, but gives instead a distillate consisting ordinarily of 83% diisopropylamine, 12% water, and 5% isopropyl alcohol. Even when the distillation is carried out in the laboratory under very carefully controlled conditions, I have found that the diisopropylamine-water azeotrope contains around 1% of isopropyl alcohol.

I have now discovered a superior process for isolating diisopropylamine, in which isopropyl alcohol is removed completely from mixtures containing diisopropylamine and isopropyl alcohol by an azeotropic-distillation method comprising the following steps: Water and an inert organic liquid of a type subsequently to be described are added to the mixture of diisopropylamine and isopropyl alcohol; a heterogeneous azeotrope boiling substantially below the diisopropylamine-water azeotrope and containing isopropyl alcohol in both of the phases is fractionally distilled; the distillate phases are separated; one phase is refluxed to the still column, while the other phase is withdrawn until all of the isopropyl alcohol has been removed from the still; the remaining water and inert organic liquid are separated; and the diisopropylamine is subsequently distilled in substantially pure form.

It will be readily apparent to those skilled in the art that in my process the treatment of the mixture of diisopropylamine and isopropyl alcohol can be continued, additional water and inert organic liquid being introduced into the still if necessary, until tests on the material remaining in the still kettle show that it is entirely free from isopropyl alcohol. The prior-art process, on the other hand, attempts the much more difficult operation of distilling a material directly away from an impurity. In the prior-art process, the quality of the final product is therefore less susceptible to control, since it is directly dependent on the size and type of still column, the distillation rate, and the reflux ratio, and may be greatly affected by an irregularity in the operation of the process.

In one specific embodiment, my invention comprises the following steps:

1. To a mixture containing diisopropylamine and isopropyl alcohol are added water and an inert organic liquid capable of forming a heterogeneous azeotrope with water and isopropyl alcohol boiling substantially below the diisopropylamine-water azeotrope (74.2° C.).

2. The mixture is distilled through an efficient fractionating column, and a heterogeneous azeotrope comprising isopropyl alcohol, water, the inert organic liquid, and a small proportion of diisopropylamine is condensed overhead.

3. The distillate layers are separated, the upper layer comprising the inert organic liquid is refluxed to the still column, and simultaneously the lower layer comprising water and isopropyl alcohol is withdrawn until all of the isopropyl alcohol has been removed from the still.

4. The distillation is continued, additional water being added to the still if necessary, and the aqueous layer of the distillate is refluxed to the still column while the upper layer comprising the inert organic liquid is withdrawn until the vapor temperature at the top of the still column reaches 74° C., at which point all of the inert organic liquid has been removed from the still.

5. The water remaining in the still is removed.

6. Finally, the diisopropylamine is fractionally distilled in substantially pure form.

In the foregoing embodiment of my invention, the inert organic liquid is added to the still charge in a quantity sufficient to produce the heterogeneous azeotrope of isopropyl alcohol, water, and the inert organic liquid. Ordinarily, a quantity of the inert organic liquid equal to from about 5 to 15% of the weight of diisopropylamine in the still charge will be found sufficient. However, the quantity will vary, depending on the size of the fractionating column, and especially on the amount of liquid held up in the decanter.

The quantity of water present in the still charge in the foregoing embodiment of my invention will also vary, depending on the quantity of isopropyl alcohol present in the still and on the identity of the inert organic liquid. It is essential that a sufficient quantity of water be added to the still either initially or prior to the completion of Step 3, described above, to carry away all of the isopropyl alcohol present initially in the still charge. The required quantity of water will therefore be a function of the weight of isopropyl alcohol in the still charge and of the concentration of isopropyl alcohol in the aqueous layer of the isopropyl alcohol-water-inert organic liquid azeotrope. When benzene is used as the inert organic liquid, for example, the concentration of isopropyl alcohol in the water layer averages approximately 8%; with cyclohexane as the inert organic liquid, the proportion of isopropyl alcohol averages about 15%; with n-hexane, 15%; and with isopropyl ether, 5%. An excess of water is preferably added to the still charge to insure the complete removal of the isopropyl alcohol. When benzene is used as the inert organic liquid, the ratio of water to isopropyl alcohol in the original still charge is therefore preferably at least about 8:1 by weight.

In Step 5, the removal of the water remaining in the still may be carried out as described in the prior art by treatment of the still residue with a dehydrating agent such as sodium hydroxide. I have discovered, however, that in the complete absence of isopropyl alcohol, the diisopropylamine-water azeotrope is heterogeneous at temperatures in excess of 27° C. I have therefore found it convenient to remove the residual water from the still residue by fractionally distilling the diisopropylamine-water azeotrope to a decanter maintained at a temperature above 27° C., refluxing the upper (diisopropylamine) layer, simultaneously withdrawing the lower (aqueous) layer until the distillate becomes homogeneous, and subsequently removing the small quantity of water remaining in the still as an intermediate fraction boiling from 74 to around 82° C.

To those skilled in the art, it will be obvious that the various fractions separated from the still during Steps 2 to 5, inclusive, in the foregoing description of my invention may be reprocessed or recycled conveniently. The aqueous isopropyl alcohol layer from Step 1 may be fractionally distilled to separate the isopropyl alcohol. The mixture of inert organic liquid and a small proportion of diisopropylamine from Step 4 may be recycled in succeeding batches. The water separated from the still in Step 5 and the succeeding wet diisopropylamine intermediate fraction may also be recycled in succeeding batches.

In a second specific embodiment, my invention comprises the following steps:

1. To a mixture containing diisopropylamine and isopropyl alcohol are added water and an inert organic liquid capable of forming a heterogeneous azeotrope with water and isopropyl alcohol boiling substantially below the diisopropylamine-water azeotrope (74.2° C.).

2. The mixture is distilled through an efficient fractionating column, and a heterogeneous azeotrope comprising isopropyl alcohol, water, the inert organic liquid, and a small proportion of diisopropylamine is condensed overhead.

3. The distillate layers are separated, the aqueous layer is refluxed to the still column, and simultaneously the layer comprising isopropyl alcohol and the inert organic liquid is withdrawn until all of the isopropyl alcohol and the inert organic liquid have been removed from the still.

4. The water remaining in the still is removed.

5. Finally, the diisopropylamine is fractionally distilled in substantially pure form.

In the second specific embodiment of my invention, the water must be present in a proportion sufficient to produce the heterogeneous azeotrope of isopropyl alcohol, water, and the inert organic liquid. The required quantity of the inert organic liquid will vary, depending on the concentration of isopropyl alcohol in the upper layer of the heterogeneous azeotrope, and on the identity of the inert organic liquid. When benzene is used as the inert organic liquid, for example, the upper layer of the azeotrope averages around 15% isopropyl alcohol. The ratio of benzene to isopropyl alcohol in the original charge should therefore be at least around 4:1 by weight, in order to allow a sufficient excess of the inert organic liquid to insure complete removal of the isopropyl alcohol.

In general, a choice can be made between the two foregoing embodiments of my invention on the basis of the relative distribution of isopropyl alcohol between the organic and aqueous layers of the distillate, and on the basis of the relative economics of the two procedures.

In order for the foregoing methods to be effective, the inert organic liquid must have the following properties and all organic liquid having the designated group of properties are suitable for use in my process:

1. It must be unreactive with water, isopropyl alcohol, and diisopropylamine at temperatures up to around 80° C.

2. It must form a heterogeneous azeotrope with water boiling sufficiently below the boiling point of the diisopropylamine-water azeotrope (74.2° C.) to permit satisfactory separation by fractional distillation.

3. The inert organic liquid or its water azeotrope must have a boiling point sufficiently below diisopropylamine to permit easy separation by fractional distillation.

Numerous inert organic liquids satisfy the foregoing requirements regarding boiling point and azeotrope-formation. Especially suitable are a number of ethers and straight-chain, branched-chain, and cyclic hydrocarbons. As specific examples of the above classes of inert organic liquids suitable for use in my process may be cited the following: benzene, cyclohexane, n-hexane, 2 2-dimethylpentane, 2,2,3-trimethylbutane, 1-hexene, 2-hexene, 3-hexene, isopropyl ether, butyl methyl ether, ethyl isobutyl ether, butyraldehyde, and ethyl methyl ketone. Esters are definitely unsatisfactory, owing to the fact that they react rapidly with diisopropylamine to form N-substituted amides.

The various distillation steps may be carried out in conventional equipment, such as a still comprising a kettle, a column having plates and bubble-caps in sufficient number to separate fractions boiling within 4-6° C. of each other, a condenser, a decanter arranged to permit reflux of either upper or lower layer to the still column, and one or more receivers of suitable design. The process may be carried out stepwise in batch-type apparatus, or it may be carried out continuously in a series of still columns, each column serving to carry out one step of the process.

The following examples are given to illustrate my invention, and are not to be construed as limiting it to the exact materials, steps, or conditions described:

*Example 1*

To a batch of crude diisopropylamine comprising 400 parts by weight of diisopropylamine and 26.1 parts of isopropyl alcohol in a still kettle were added 244 parts of water and 41.4 parts of benzene, and the mixture was distilled through an efficient fractionating column to a condenser and decanter, from which the upper (benzene) layer was totally refluxed to the still column, and the lower (aqueous) layer comprising 8% isopropyl alcohol and 0.3% diisopropylamine was taken off until the distillate became homogeneous, at which point all of the isopropyl alcohol had been removed from the still charge. Fifty parts of distilled water were then added to the still, and the distillation was resumed with total reflux of the water layer. The upper layer, containing benzene and diisopropylamine, was taken off up to a vapor temperature of 74° C., at which temperature all of the benzene had been removed. The mixture of benzene and diisopropylamine was recycled in subsequent batches. At 74° C. the distillate, consisting of the diisopropylamine-water azeotrope, was heated in a decanter to a temperature above 27° C. to cause separation into layers, the upper layer was refluxed to the still column, and the lower (water) layer was withdrawn until the distillate became homogeneous. Subsequently, a small wet-diisopropylamine fraction, boiling range 74–82° C., was taken off and held for recycling. Finally the pure diisopropylamine fraction, boiling around 84° C. was distilled. A total of 256.8 parts of diisopropylamine was separated, analyzing 99.6% pure.

Example 2

To a batch of crude diisopropylamine comprising 400 parts by weight of diisopropylamine and 26.1 parts of isopropyl alcohol in a still kettle were added 244 parts of water and 38.9 parts of cyclohexane, and the mixture was distilled through an efficient fractionating column. The vapors were condensed and allowed to pass into a decanter, from which the upper (cyclohexane) layer was totally refluxed to the still column, and the lower (aqueous) layer comprising 15% isopropyl alcohol and 0.7% diisopropylamine was taken off until the distillate became homogeneous, at which point all of the isopropyl alcohol had been removed from the still charge. To the still were then added 50 parts of water (free from isopropyl alcohol), and the distillation was resumed with total reflux of the water layer. The upper layer, containing cyclohexane and diisopropylamine, was taken off up to a vapor temperature of 74° C., at which temperature all of the cyclohexane had been removed. The mixture of cyclohexane and diisopropylamine was recycled in subsequent distillations. At 74° C. the distillate, consisting of the diisopropylamine-water azeotrope, was heated in a decanter to a temperature above 27° C. to cause separation into layers, the upper layer was refluxed to the still column, and the lower (water) layer was withdrawn until the distillate became homogeneous. Subsequently, a small wet-diisopropylamine fraction, boiling range 74–82° C., was taken off and held for recycling. Finally, the pure diisopropylamine fraction, boiling around 84° C., was distilled. A total of 290 parts of diisopropylamine was separated, analyzing 99.6% pure.

Example 3

To a batch of crude diisopropylamine comprising 400 parts by weight of diisopropylamine and 26.1 parts of isopropyl alcohol in a still kettle were added 244 parts of water and 33.0 parts of n-hexane, and the mixture was distilled through an efficient fractionating column. The vapors were condensed and allowed to flow into a decanter, from which the upper (n-hexane) layer was totally refluxed to the still column, and the lower (aqueous) layer comprising 15% isopropyl alcohol and 0.04% diisopropylamine was taken off until the distillate became homogeneous, at which point all of the isopropyl alcohol had been removed from the still charge. To the still were then added 50 parts of water (free from isopropyl alcohol), and the distillation was completed as in Example 1. A total of 206 parts of diisopropylamine was separated, analyzing 99.2% pure.

Example 4

To a batch of crude diisopropylamine comprising 400 parts of weight of diisopropylamine and 26.1 parts of isopropyl alcohol in a still kettle were added 244 parts of water and 33.0 parts of isopropyl ether, and the mixture was distilled through an efficient fractionating column. The vapors were condensed and allowed to flow into a decanter, from which the upper (isopropyl ether) layer was totally refluxed to the still column, and the lower (aqueous) layer comprising 5% isopropyl alcohol and 0.03% diisopropylamine was taken off until the distillate became homogeneous, at which point all of the isopropyl alcohol had been removed from the still charge. The distillation was completed as described in Example 1. A total of 256 parts of diisopropylamine was separated, analyzing 99.8% pure.

Example 5

To a batch of crude diisopropylamine comprising 400 parts by weight of diisopropylamine and 26.2 parts of isopropyl alcohol in a still kettle were added 56.0 parts of water and 105 parts of benzene, and the mixture was distilled through an efficient fractionating column. The vapors were condensed and allowed to flow into a decanter, from which the lower (aqueous) layer was totally refluxed to the still column, and the upper (benzene) layer comprising an average of 80% benzene, 15% isopropyl alcohol, and 5% diisopropylamine was taken off until the temperature at the top of the column had reached 74° C., at which point all of the isopropyl alcohol and benzene had been removed from the still charge. At 74° C. the distillate, consisting of the diisopropylamine-water azeotrope, was heated in a decanter to a temperature above 27° C. to cause separation into layers, the upper layer was refluxed, and the lower (aqueous) layer was withdrawn until the distillate became homogeneous. Subsequently, a small wet-diisopropylamine fraction, boiling range 74–82° C. was taken off and held for recycling. Finally, the pure diisopropylamine fraction, boiling around 84° C., was distilled. A total of 261.8 parts of diisopropylamine was separated, analyzing 100% pure.

I claim as my invention:

1. A process for separating diisopropylamine from a mixture containing diisopropylamine and isopropyl alcohol which comprises adding to said mixture water and a hydrocarbon which forms a heterogeneous azeotrope with water and isopropyl alcohol boiling below the diisopropylamine-water azeotrope, azeotropically distilling the resulting mixture to separate the isopropyl alcohol from the amine, removing the residual water and hydrocarbon, and fractionally distilling the diisopropylamine.

2. The process of claim 1 wherein said hydrocarbon is benzene.

3. The process of claim 1 wherein said hydrocarbon is cyclohexane.

4. The process of claim 1 in which the hydrocarbon is benzene, and in which the ratio of benzene to isopropyl alcohol in the original charge is at least about 4:1 by weight.

5. A process of separating diisopropylamine from mixtures containing diisopropylamine and isopropyl alcohol which comprises adding to such a mixture water and an organic liquid having the characteristic properties of being nonreactive with water, isopropyl alcohol and diisopropylamine at temperatures up to 80°C., of forming a heterogeneous azeotrope with water boiling sufficiently below the diisopropylamine-water azeotrope to permit separation by fractional distillation, the boiling point of diisopropylamine being sufficiently above the boiling point of a composition selected from a class consisting of said organic liquid and the water azeotrope thereof to permit separation of said composition from mixtures thereof with diisopropylamine by fractional distillation, then azeotropically distilling the resulting mixture to separate the isopropyl alcohol and the organic liquid from the amine, removing the residual water and fractionally distilling the diisopropylamine.

6. The process of claim 5 wherein said inert organic liquid is an aliphatic ether.

7. The process of claim 6 wherein said inert organic liquid is isopropyl ether.

8. The process of claim 5 in which the residual inert organic liquid is removed by azeotropic distillation with water.

9. A process for separating diisopropylamine from mixtures containing diisopropylamine and isopropyl alcohol which comprises adding to the said mixtures water and an inert organic liquid having the characteristic properties of being nonreactive with water, isopropyl alcohol and diisopropylamine at temperatures up to 80° C., of forming a heterogeneous azeotrope with water boiling sufficiently below the diisopropylamine-water azeotrope to permit separation by fractional distillation, the boiling point of diisopropylamine being sufficiently above the boiling point of a composition selected from a class consisting of said organic liquid and the water azeotrope thereof to permit separation of said composition from mixtures thereof with diisopropylamine by fractional distillation, then fractionally distilling the mixture through an efficient column, separating the distillate layers in a decanter, refluxing the layer comprising the inert organic liquid to the still column and simultaneously withdrawing the layer comprising water and isopropyl alcohol, continuing the distillation until all of the isopropyl alcohol has been removed, fractionally distilling the water azeotrope of the inert organic liquid to a decanter, separating the layers of the distillate, refluxing the aqueous layer, and simultaneously withdrawing the layer comprising the inert organic liquid until all of the inert organic liquid has been removed, separating the residual water from the material remaining in the still kettle, and subsequently fractionally distilling the diisopropylamine in substantially pure state.

10. A process for separating diisopropylamine from mixtures containing diisopropylamine and isopropyl alcohol which comprises adding to the said mixtures water and an inert organic liquid having the characteristic properties of being nonreactive with water, isopropyl alcohol and diisopropylamine at temperatures up to 80°C. of forming a heterogeneous azeotrope with water boiling sufficiently below the diisopropylamine-water azeotrope to permit separation by fractional distillation, the boiling point of diisopropylamine being sufficiently above the boiling point of a composition selected from a class consisting of said organic liquid and the water azeotrope thereof to permit separation of said composition from mixtures thereof with diisopropylamine by fractional distillation, then fractionally distilling the mixture through an efficient column separating the distillate layers in a decanter, refluxing the layer comprising the inert organic liquid to the still column and simultaneously withdrawing the layer comprising water and isopropyl alcohol, continuing the distillation until all of the isopropyl alcohol has been removed, adding a small proportion of water to the still, fractionally distilling to a decanter, separating the layers of the distillate, refluxing the aqueous layer and simultaneously withdrawing the layer comprising the inert organic liquid until all of the inert organic liquid has been removed, continuing to distill to a decanter maintained at a temperature of not less than 27° C., separating the layers of the distillate, refluxing the layer comprising diisopropylamine and simultaneously withdrawing the aqueous layer until the distillate becomes homogeneous, removing the residual water as a small intermediate fraction comprising mainly diisopropylamine, and subsequently fractionally distilling the diisopropylamine in substantially pure state.

11. The process of claim 10 in which the ratio of water to isopropyl alcohol in the orginal still charge is at least about 8:1 by weight.

12. A process for separating diisopropylamine from mixtures containing diisopropylamine and isopropyl alcohol which comprises adding to the said mixtures water and an inert organic liquid having the characteristic properties of being nonreactive with water, isopropyl alcohol and diisopropylamine at temperatures up to 80°C., of forming a heterogeneous azeotrope with water boiling sufficiently below the diisopropylamine-water azeotrope to permit separation by fractional distillation, the boiling point of diisopropylamine being sufficiently above the boiling point of a composition selected from a class consisting of said organic liquid and the water azeotrope thereof to permit separation of said composition from mixtures thereof with diisopropylamine by fractional distillation, then fractionally distilling the mixture through an efficient column, separating the distillate layers in a decanter, refluxing the aqueous layer to the still column and simultaneously withdrawing the layer comprising isopropyl alcohol and the inert organic liquid, continuing the distillation until all of the isopropyl alcohol and the inert organic liquid have been removed, separating the residual water from the material remaining in the still kettle, and subsequently fractionally distilling the diisopropylamine in substantially pure state.

13. A process for separating diisopropylamine from mixtures containing diisopropylamine and isopropyl alcohol which comprises adding to the said mixtures water and an inert organic liquid having the characteristic properties of being nonreactive with water, isopropyl alcohol and diisopropylamine at temperatures up to 80° C., of forming a heterogeneous azeotrope with water boiling sufficiently below the diisopropylamine-water azeotrope to permit separation by fractional distillation, the boiling point of diisopropylamine being sufficiently above the boiling point of a composition selected from a class consisting of said organic liquid and the water azeotrope thereof to permit separation of said composition from mixtures thereof with diisopropylamine by fractional distillation, then fractionally distilling the mixture through an efficient column, separating the distillate layers in a decanter, refluxing the aqueous layer to the still column and simultaneously withdrawing the layer comprising isopropyl alcohol and the inert organic liquid, continuing the distillation until all of the isopropyl alcohol and the inert organic liquid have been removed, continuing the distillation to a decanter maintained at a temperature of not less than 27° C., separating the layers of the distillate, refluxing the layer comprising diisopropylamine and simultaneously withdrawing the aqueous layer until the distillate becomes homogeneous, removing the residual water as a small intermediate fraction comprising mainly diisopropylamine, and subsequently fractionally distilling the diisopropylamine in substantially pure state.

EVERET FOY SMITH.

REFERENCES CITED

The following references are of record in the file of this patent:

UNITED STATES PATENTS

| Number | Name | Date |
|---|---|---|
| 2,348,683 | McKenna | May 9, 1944 |
| 2,363,157 | Stasse | Nov 21, 1944 |
| 2,363,158 | Stasse | Nov. 21, 1944 |
| 2,363,159 | Stasse | Nov. 21, 1944 |